UNITED STATES PATENT OFFICE.

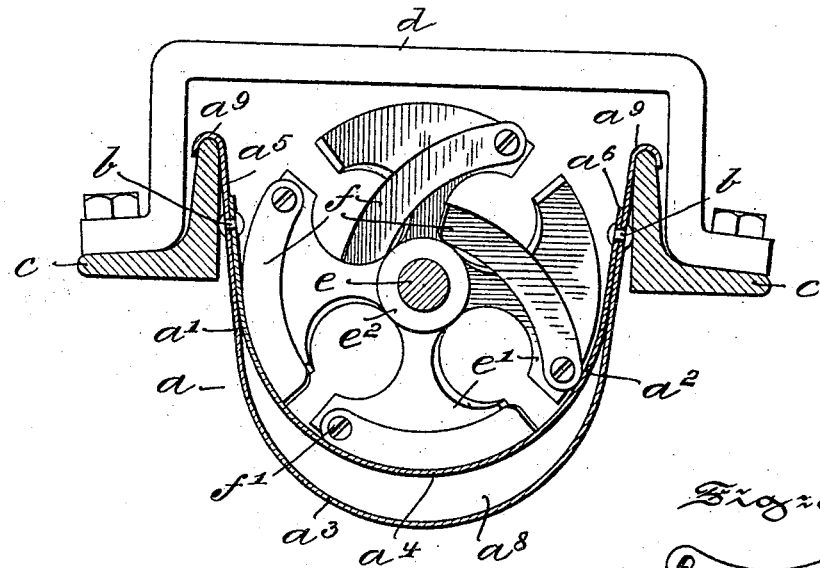
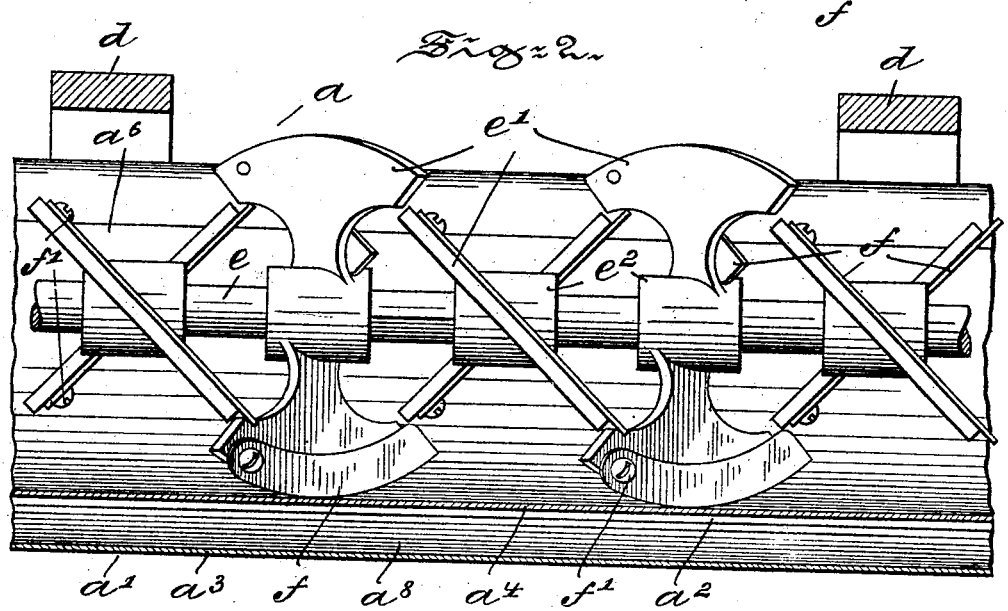

ARTHUR T. COLLINS, OF SWARTHMORE, PENNSYLVANIA.

DRIER.

No. 823,262.　　　Specification of Letters Patent.　　　Patented June 12, 1906.

Application filed March 2, 1906. Serial No. 303,785.

*To all whom it may concern:*

Be it known that I, ARTHUR T. COLLINS, a citizen of the United States, residing at Swarthmore, in the county of Delaware and State of Pennsylvania, have invented certain new and useful Improvements in Driers, of which the following is a specification.

My invention has relation to that class of driers in which disconnected spiral blades are used to move substances to be dried over the heated surface of a trough; and in such connection it relates more particularly to means pivotally connected with the spiral blades which are adapted by gravity to engage the trough, so as to follow irregularities of the heating-surface thereof.

The principal objects of my invention are, first, to provide each of the blades of a drier for treating powdered or starchy materials with a scraper which, irrespective of distortions occasioned by warping of the inner wall of the trough through the influence of heat, will be conducted over the entire inner surface to prevent burning or rendering useless the materials to be dried; second, to so connect the scrapers with the blades as to permit the same to be brought into engagement with the trough by gravity and to assume varying angular positions with respect to the supporting-blades, and, third, to hold the supporting-blades in proximity to the trough, so as to permit the movable scrapers to free adhering material to be dried on the irregular portions of the trough and to feed the same while the blades, in addition to stirring or agitating the material being dried, removes and feeds said material passing over portions of the trough in proximity to the blades.

The nature and scope of my present invention will be more fully understood from the following description, taken in connection with the accompanying drawings, forming part hereof, in which—

Figure 1 is a view illustrating, partly in elevation and partly in cross-section, a conveyer-trough, the manner of forming a chamber to receive a heating medium, the conveyer arranged in the trough and the disconnected conveyer-blades provided with scrapers pivotally connected therewith, all embodying main features of my said invention. Fig. 2 is a view illustrating, partly in longitudinal section and partly in elevation, a portion of the conveyer-trough, the manner of arranging the conveyer-blades with respect to each other and the scrapers carried by the said blades; and Fig. 3 is a detail view illustrating one of the scrapers removed from its supporting-blade.

Referring to the drawings, $a$ represents a trough, preferably formed of two strips of sheet metal $a'$ and $a^2$, bent semicircular at $a^3$ and $a^4$ and terminating, respectively, in straight converging portions $a^5$ and $a^6$, which are united with each other, preferably by rivets $b$, to form a chamber $a^8$ for the reception of steam, heated air, or other suitable heating medium. The straight portions $a^5$ of the outer strip $a'$ are provided with bent portions or ledges $a^9$, adapted to engage the upper edges of carriers or supports $c$, preferably formed of angle-irons held a certain distance apart from each other by yokes or spanners $d$. The heating medium—for instance, steam—when introduced in the chamber $a^8$ has a tendency to warp or distort the strips of sheet metal $a'$ and $a^2$, forming the trough $a$, which warping in a longitudinal direction is effectually prevented by the supports $c$ and yokes $d$, forming a rigid structure, while in a vertical direction the distortions prevent the conveyer-blades $e'$, carried by a shaft $e$, to contact with the inner wall $a^2$ of the trough $a$. However, the portions of the material placed in the trough $a$ to be dried when not moved in the trough will burn, and thus be spoiled if adhering to the inner wall $a^2$ thereof. To overcome this disadvantage and permit of a uniform drying of the material, each of the blades $e'$ is provided with a scraper, consisting of a curved blade $f$, projecting a certain distance beyond the blade and resting freely upon the inner or drying surface of the trough $a$. Each of the scrapers $f$ by being pivotally connected by a bolt $f'$ to a blade $e'$, which passes through a slot $f^2$, arranged in the scraper $f$, will readily follow irregularities caused by distortions of the inner wall $a^2$ of the trough $a$ and will move the material not reached by the blades $e'$, even if the same be extended close to the trough $a$. As soon as the scrapers $f$ reach a certain elevated position in the rotation of the blades $e'$ by the shaft $e$ the blades swinging on their bolts $f'$ are brought into engagement with the bearing $e^2$ of the blades $e'$, by which movement material adhering to the scrapers will be shaken off therefrom. At the same time in a certain vertical position the scrapers will be brought by gravity into reëngagement with the trough $a$. The blades $e'$ at their outer perimeters are held in proximity to the trough $a$, and thus assist the scrapers $f$ in moving the material to be dried along the trough. At the same time the blades $e'$, being disconnected with each other, stir or agitate to a certain extent the material to be dried, thereby facilitating the drying operation.

Having thus described the nature and objects of my invention, what I claim as new, and desire to secure by Letters Patent, is—

1. In a drier of the character described, a trough adapted to receive material to be dried, a conveyer having blades adapted to move the material forward in said trough, and a scraper carried by each of said blades adapted to be held by gravity in engagement with said trough and move forward portions of the material not affected by said blades.

2. In a drier of the character described, a trough adapted to receive and dry material placed therein, a conveyer having disconnected spirally-set blades adapted to move the material forward in the trough, and a scraper pivotally connected with each of said blades, said scrapers arranged to follow irregularities of the inner wall of said trough to remove portions of the material not affected by said blades.

3. In a drier of the character described, a trough adapted to receive and dry material placed therein, a conveyer having disconnected spirally-set blades adapted to agitate and move the material forward in said trough, a scraper pivotally connected with each of said blades, said scrapers arranged to be actuated by said blades and to engage by gravity certain portions of said trough.

4. In a drier of the character described, a trough adapted to receive and dry material placed therein, a conveyer having disconnected spirally-set blades adapted to agitate and move the material forward in said trough, a scraper pivotally connected at one end with each of said blades and projecting beyond the same, each of said scrapers adapted to be held by gravity in engagement with certain portions of said trough and to follow irregularities thereof so as to move forward portions of the material not affected by said blades.

In witness whereof I have hereunto set my signature in the presence of two subscribing witnesses.

ARTHUR T. COLLINS.

Witnesses:
GEO. W. REED,
J. WALTER DOUGLASS.